United States Patent
Pathak

(10) Patent No.: US 9,613,372 B2
(45) Date of Patent: Apr. 4, 2017

(54) SYSTEM, METHOD, AND NON-TRASITORY COMPUTER-READABLE STORAGE MEDIA FOR DISPLAYING PRODUCT INFORMATION ON WEBSITES

(71) Applicant: Wal-Mart Stores, Inc., Bentonville, AR (US)

(72) Inventor: Manas A. Pathak, Sunnyvale, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 87 days.

(21) Appl. No.: 14/671,769

(22) Filed: Mar. 27, 2015

(65) Prior Publication Data
US 2016/0283998 A1    Sep. 29, 2016

(51) Int. Cl.
*G06Q 30/00* (2012.01)
*G06F 17/30* (2006.01)
*G06Q 30/06* (2012.01)

(52) U.S. Cl.
CPC ... *G06Q 30/0625* (2013.01); *G06F 17/30424* (2013.01); *G06F 17/30554* (2013.01); *G06F 17/30864* (2013.01); *G06Q 30/0627* (2013.01); *G06Q 30/0641* (2013.01)

(58) Field of Classification Search
CPC ...... G06Q 30/0601–30/0643; G06F 17/30424; G06F 17/30442; G06F 17/30554; G06F 17/30861; G06F 17/30864
USPC ...................................................... 705/26.62
See application file for complete search history.

(56) References Cited

U.S. PATENT DOCUMENTS

| | | | | |
|---|---|---|---|---|
| 2008/0033939 | A1* | 2/2008 | Khandelwal | G06F 17/30707 |
| 2010/0082592 | A1* | 4/2010 | Ruvini | G06Q 30/08 707/706 |
| 2011/0264560 | A1* | 10/2011 | Griffiths | G06Q 10/06 705/27.1 |
| 2014/0089124 | A1* | 3/2014 | Jha | G06F 17/3089 705/26.3 |

(Continued)

OTHER PUBLICATIONS

Ghani R et al, "Text Mining for Product Attribution Extraction" ACM DIGKDD Explorations Newsletter, vol. 8, No. 1, 2006, pp. 41-48.*

*Primary Examiner* — William Allen
*Assistant Examiner* — Matthew Todd
(74) *Attorney, Agent, or Firm* — Howard & Howard Attorneys PLLC

(57) ABSTRACT

A system for displaying product information to a customer is described herein. The system includes a processor that is programmed to receive search data in response to a product search request received from the customer and retrieve product records associated with the search data from a database. Each product record is associated with a corresponding product and includes a product description and a plurality of item attributes having corresponding attribute values. The processor selects a set of the item attributes and generates a product summary for each of the products as a function of the selected set of item attributes. Each product summary includes corresponding attribute values associated with the selected set of item attributes. The processor generates and displays product information associated with each of the products being included in the search data. The associated product information includes a corresponding product summary and a corresponding product description.

20 Claims, 7 Drawing Sheets

(56) References Cited

U.S. PATENT DOCUMENTS

2016/0154862 A1* 6/2016 Gabbai ................. G06F 3/0482
  707/722

* cited by examiner

| 30 | 32 | 34 | 36 | 36 | 36 |
|---|---|---|---|---|---|
| Product | Category | Description | Screen Size | RAM | Hard Drive |
| Laptop 1 | Computer | Image file 1, text 1 | 17" | 4 GB | 500 GB |
| Laptop 2 | Computer | Image file 2, text 2 | 11.5" | 8 GB | 1 TB |
| Laptop 3 | Computer | Image file 3, text 3 | 15.6" | 4 GB | 500 GB |

| 30 | 32 | 34 | 36 | 36 | 36 |
|---|---|---|---|---|---|
| Product | Category | Description | Size | Type | Resolution |
| TV 1 | Electronics | Image file A, text 1 | 50" | LCD | 1080p |
| TV 2 | Electronics | Image file B, text 2 | 42" | LED | 4K |
| TV 3 | Electronics | Image file C, text 3 | 20" | LED | 720p |

FIG. 6

| Attribute Ranking | Product Category | | | |
| --- | --- | --- | --- | --- |
| | Computer | Tables | Clothes | Television |
| 1 | Processor | Shape | Department | Size |
| 2 | Memory | Material | Size | Type |
| 3 | Display | Brand | Color | Brand |
| 4 | Operating System | Color | Brand | Resolution |
| 5 | Brand | Size | Retailer | Inputs |

FIG. 7

SYSTEM, METHOD, AND NON-TRASITORY COMPUTER-READABLE STORAGE MEDIA FOR DISPLAYING PRODUCT INFORMATION ON WEBSITES

FIELD OF THE DISCLOSURE

The present invention relates to providing product information to a consumer, and more particularly, to systems, methods, and computer-readable storage media that generates and displays product information via a website in response to a consumer's product search request.

BACKGROUND

Many consumers desire to order items or goods remotely, e.g., on-line, through the Internet, or using a specially designed application or app on a personal computer or mobile device, such as a tablet or cell phone. At least some known web hosting systems include search engines that allow consumers to enter search criteria and generate search results based on the consumer's search criteria. Known search engines may generate and display product lists to consumers via a website including products that are selected based on the search criteria. Some known search engines may also generate search relevance scores associated with selected products based on the search terms entered by the consumer.

In response to a search query, known search engines may also display a set of ranked items along with a snippet of textual information describing each item. In known product search engines, the search result snippets are usually in the form of static text providing information about the corresponding product. The information provided in known snippets includes general descriptions of the products without specific details or features relating to the displayed product. In known systems, users are required to click photos or general product descriptions to navigate to product-specific webpages that display the detailed information about the corresponding product features. This requires the user to continually navigate between product-specific webpages and the search results.

Because the information being displayed in the snippet is static, consumers may become frustrated with the displayed results, in part, because the snippet information may not be relevant to the search query received from the customer. As such, customers may navigate away from the search webpage, resulting in a reduction in an order conversion rate of the webpage and loss of potential orders generated via a product search.

In addition, in response to a product search request, at least some known search engines retrieve each product record contained in a database and display each product record in a sorted list. Because of the number of product records that may be included in a product database, at least some known search engines require significant computing time and resources to generate and display the sorted product lists to the consumer. As the amount of product records being included in a database increases, the amount of computing resources that are required to perform the search functions increase, thus reducing the overall performance of known web hosting systems.

The present invention is aimed at one or more of the problems identified above.

SUMMARY OF THE INVENTION

In different embodiments of the present invention, systems, methods, and computer-readable storage media allow users to display relevant product information to a consumer via a website.

In one embodiment, a system for displaying product information to a customer is provided. The system includes a database and a server including a processor. The database includes a plurality of product records associated with a plurality of products. Each product record includes a product description and a plurality of item attributes having corresponding attribute values. The processor is programmed to receive search data including products associated with a product search request and retrieve product records associated with the search data from the database. The processor selects a set of the item attributes and generates a product summary for each of the products included in the search data as a function of the selected set of item attributes. Each product summary includes corresponding attribute values associated with the selected set of item attributes. The processor generates and displays a product search result including product information associated with each of the products being included in the search data. The associated product information includes a corresponding product summary and a corresponding product description.

In another embodiment a method for displaying product information to a customer is provided. The method includes receiving search data in response to a product search request received from the customer and retrieving product records associated with the search data from a database. The search data includes products associated with the product search request. Each product record is associated with a corresponding product and includes a product description and a plurality of item attributes having corresponding attribute values. The method includes selecting a set of the item attributes and generating a product summary for each of the products included in the search data as a function of the selected set of item attributes. Each product summary includes the corresponding attribute values associated with the selected set of item attributes. The method includes generating and displaying a product search result including product information associated with each of the products included in the search data. The associated product information includes a corresponding product summary and a corresponding product description.

In yet another embodiment, one or more non-transitory computer-readable storage media, having computer-executable instructions embodied thereon are provided. When executed by at least one processor, the computer-executable instructions cause the processor to receive search data in response to a product search request received from the customer and retrieve product records associated with the search data from a database. The search data includes products associated with the product search request. Each product record is associated with a corresponding product and includes a product description and a plurality of item attributes having corresponding attribute values. The processor selects a set of the item attributes and generates a product summary for each of the products included in the search data as a function of the selected set of item attributes. Each product summary includes corresponding attribute values associated with the selected set of item attributes. The processor generates and displays a product search result including product information associated with each of the products being included in the search data. The associated product information includes a corresponding product summary and a corresponding product description.

BRIEF DESCRIPTION OF THE FIGURES

Non-limiting and non-exhaustive embodiments of the present invention are described with reference to the following figures. Other advantages of the present disclosure will be readily appreciated, as the same becomes better understood by reference to the following detailed description when considered in connection with the accompanying drawings wherein:

FIG. 6 is an illustration of an exemplary screenshot from the system of FIG. 1, according to an embodiment of the present invention; and, FIG. 7 is an illustration of an exemplary screenshot from the system of FIG. 1, according to an embodiment of the present invention.

Figure 1:
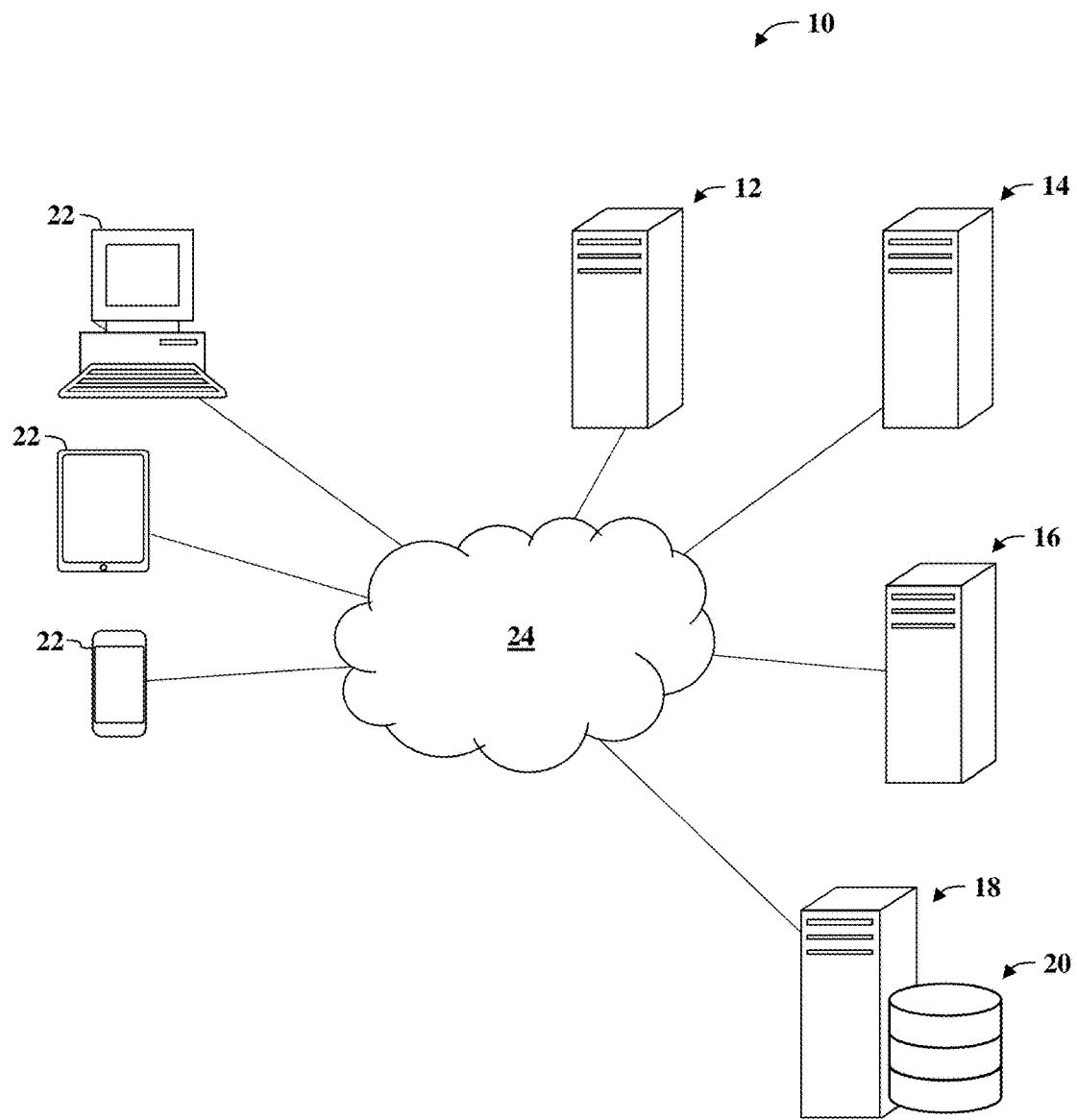
FIG. 1 is a schematic illustrating various aspects of a system, according to the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis. The term "coupled" means any suitable communications link, including but not limited to the Internet, a LAN, a cellular network, or any suitable communications link. The communications link may include one or more of a wired and wireless connection and may be always connected, connected on a periodic basis, and/or connected on an as needed basis.

The disclosure particularly describes how product information may be displayed via a website to a consumer to increase the likelihood of the consumer purchasing one or more products being displayed and increase a conversion rate of the corresponding webpage. The conversion rate may be indicative of a rate at which a corresponding web page facilitates a user completing a predefined user activity such as, for example, viewing a predefined web page, ordering a product and/or service, and/or performing a predefined user task. Particularly, the present disclosure describes how a system provides a website to a consumer, receives a product search request from the consumer via a search webpage, and generates and displays relevant product information to the consumer in response to the request. The product information associated with each product includes a product summary that includes item attributes that are selected based on previous search results, product categories, and the like. In addition, each product summary may display the same item attributes to allow the customer to quickly compare products being displayed in a search result.

In general, the present invention describes a system that implements a structured snippets system that automatically generates textual product summary snippets using item attributes associated with the corresponding product. In one embodiment, the system includes product records that contain structured metadata for each product item. The item metadata may be in the form of attributes that describe the item such as, for example, product color, brand, and size in a more general case. Some of these attributes may also be category specific, e.g., computer items have attributes such as processor type and hard disk size. The structured product summary snippets present relevant product information in the form key-value pairs consisting of the most relevant item attributes. In addition, the system may also generate the structured snippets including natural language English text from the item attributes.

In addition, the system may generate product summary structured snippets that are user interactive. In one embodiment, the system may associated the attributes with hyperlinks that may initiate additional search features when accessed by the user. For example, by clicking on an attribute, e.g., color: blue, the system may can return all items having the attribute color: blue in the result set.

The attributes of an item are not equally important. Accordingly, the system may also rank a set of attributes based on their popularity with respect to received search query. This results in a product summary snippet that is highly relevant to the search query. The system may obtain the query-attribute popularity data from other user interactions such as, for example, facet clicks per query. For example, at least one advantage of displaying relevant product summary snippets is to help users compare the products in the search results instead of clicking to item descriptions. This reduces the user effort and time when they are using an ecommerce website and will thus lead to higher conversions. By providing product summary snippets that are relevant to the search query, the product summary snippets are significantly superior to conventional static text snippets.

For example, in one embodiment, the system may generate search data including a plurality of product records associated with a search request received from a consumer with each of the product records including a plurality of item attributes having corresponding attribute values. The item attributes include information related to the features of the corresponding product such as, for example, color, size, shape, and/or any suitable product feature that may be useful in comparing similar products. The system selects a subset of the item attributes and generates a product summary snippet for each product included in the search data. Each product summary snippet includes the same selected item attributes, and includes the corresponding attribute values associated with the product. In addition, the system may select the item attributes being included in the product summaries based on the popularity of an item attribute. For example, the system may store one or more previous search requests, determine the item attributes included in the previous requests, determine a ranking of item attributes based on the previous search requests, and select the item attributes to be included in the product summaries based on the corresponding attribute ranking. For example, in one embodiment, the system may generate a relevance score for each item attribute included in the product records based on the received search request, and select the item attributes being included in product summaries as a function of the relevancy scores.

The system may also associate one or more programming commands such as, for example, hyperlinks with the displayed attribute values to allow the customer to initiate additional search requests to narrow the products being displayed with the search results. In response to a user accessing the hyperlink, the system may generate a modified search result and/or generate a filtered product list. For example, the system may display the product summary including an item attribute indicative of a product color. The system may also associate a hyperlink with a corresponding attribute value being display with the corresponding product summary snippet. The hyperlink may include a program command that generates another search request including the corresponding attribute value. For example, in one embodiment, the customer may select a hyperlink being displayed with a corresponding attribute color value, such as, for example, a color value "blue". The system responsively displays a modified search result that includes products included in the current search result and having an attribute color value equal to "blue".

With reference to the FIGS. and in operation, the present invention provides a system 10, methods and computer product media that facilitates displaying product information to a user via a website. Referring to FIG. 1, an exemplary environment in which the system 10 operates is illustrated. In the illustrated embodiment, the system 10 is configured to enable a user to access a website with one or more user computing devices to view information indicative of products that may be purchase by the user via the website. In general, the system 10 generates and displays product lists in response to receiving a product search request from a consumer via a website. The system 10 generates search data including a plurality of product records as a function of the search request, generates and displays a list of products included in the search data, and generates and displays a product summary for each of the listed products. The system 10 selects a set of item attributes and displays each product summary with the selected item attributes and the corresponding attribute values associated with each product.

By generating and displaying product summaries that include selected item attributes, the system transforms the search data into relevant product information and generates and displays product listings that are more relevant to the needs of the consumer over known search engines. Thus increasing the likelihood of a consumer purchasing a product displayed in the list and increasing the overall revenue being generated by the website. For example, the system provides relevant product listings without requiring the consumers to input filter queries and/or product categories, thus reducing the effort required by the consumer to retrieve the desired products from the website.

In addition, by generating the product summaries for each product, the system 10 improves the speed and functionality of known computing systems by reducing the amount of product records being displayed in response to a user's search request, thus reducing the computing resources required to generate and display relevant search results.

For clarity in discussing the various functions of the system 10, multiple computers and/or servers are discussed as performing different functions. These different computers (or servers) may, however, be implemented in multiple different ways such as modules within a single computer, as nodes of a computer system, etc. . . . The functions performed by the system 10 (or nodes or modules) may be centralized or distributed in any suitable manner across the system 10 and its components, regardless of the location of specific hardware. Furthermore, specific components of the system 10 may be referenced using functional terminology in their names. The function terminology is used solely for purposes of naming convention and to distinguish one element from another in the following discussion. Unless otherwise specified, the name of an element conveys no specific functionality to the element or component.

In the illustrated embodiment, the system 10 includes a website hosting server 12, a search engine server 14, a product information server 16, a database server 18, a database 20, and one or more user computing devices 22 that are each coupled in communication via a communications network 24. The communications network 24 may be any suitable connection, including the Internet, file transfer protocol (FTP), an Intranet, LAN, a virtual private network (VPN), cellular networks, etc. . . . , and may utilize any suitable or combination of technologies including, but not limited to wired and wireless connections, always on connections, connections made periodically, and connections made as needed.

The user computing device 22 may include any suitable device that enables a user to access and communicate with the system 10 including sending and/or receiving information to and from the system 10 and displaying information received from the system 10 to a user. For example, in one embodiment, the user computing device 22 may include, but is not limited to, a desktop computer, a laptop or notebook computer, a tablet computer, smartphone/tablet computer hybrid, a personal data assistant, a handheld mobile device including a cellular telephone, and the like.

The database server 18 includes a memory device that is connected to the database 20 to retrieve and store information contained in the database 20. The database 20 contains information on a variety of matters, such as, for example, web pages associated with one or more websites, search queries, customer account information, product records, data categories, category values, sorted data groups, item attributes, attribute values, ranked item attribute lists, and/or any suitable information that enables the system 10 to function as described herein.

Figure 5:
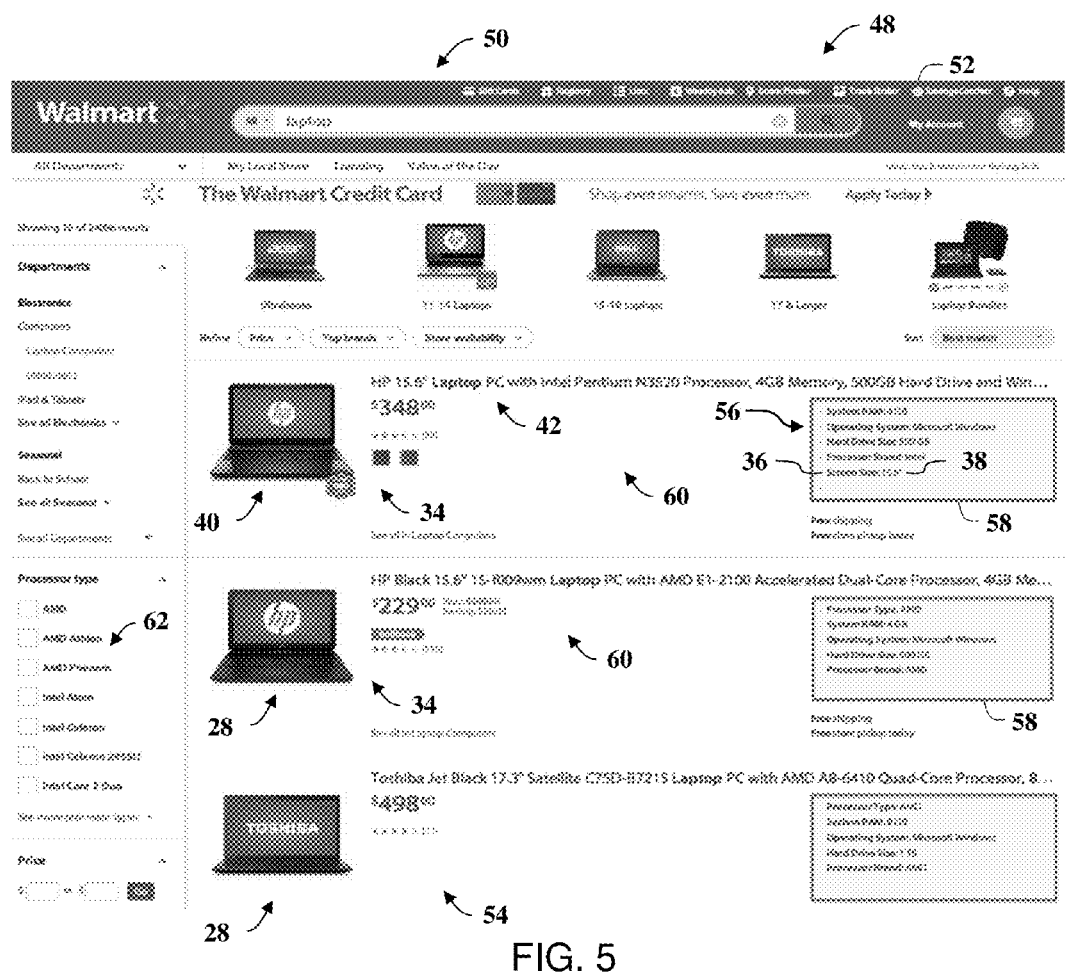
FIG. 5 is an illustration of an exemplary screenshot from the system of FIG. 1, according to an embodiment of the present invention.

For example, in one embodiment, the database 20 may contain a plurality of product records 26 (shown in FIG. 6) associated with a plurality of products 28 (shown in FIG. 5). Each product record 26 may include a product name 30, a product category 32, a product description 34, and a plurality of item attributes 36. The item attributes 36 may be associated with features and/or aspects of the corresponding products such as, for example, product color, size, brand, type, and the like. Each product record 26 includes a plurality of attribute values 38 that are associated with each item attribute 36. In one embodiment, the attribute values 38 may include information associated with the corresponding product 28 and corresponding item attribute 36. For example, in one embodiment as shown in FIG. 6, a product record 26 associated with a product, "Laptop 1" may include item attributes 36 associated with computer products including "screen size", "memory size", and/or "hard drive space", and include associated attribute values 38 including "17" screen size", "4 GB RAM", and "500 GB Hard Drive". The data contained in the product records 26 may include numerical values, image files, and/or textual information. In one embodiment, for example, the product record 26 may include a product description 34 including an image file 40 (shown in FIG. 5) of the product and a text file 42 for use in displaying a corresponding product description 34 on a webpage.

In one embodiment, as shown in FIG. 7, the database 20 may include an item attribute table 44 that includes a plurality of item attributes 36. The item attribute table 44 may also include a ranked list 46 of item attributes 36. In addition, in one embodiment, the item attribute table 44 may include one or more product categories 32 and a plurality of item attributes 36 associated with each product category 32. The item attribute table 44 may also include a ranked list 46 of item attributes 36 associated with each product category 32.

The database 20 may also include customer account records that include information about consumers including, but not limited to, a unique customer ID, username, password, name, customer address, purchase history, product search history, and/or product preferences such as, for example, product category preferences, item attribute preferences, attribute value preferences, and the like. The customer account records may be used to select item attributes 36 and/or generate a ranked list 46 of item attributes 36 based on customer product preferences and/or previous search requests associated with the corresponding customer account.

The website hosting server 12 is configured to host a website 48 that is accessible by a user via one or more user computing devices 22. The website hosting server 12 retrieves and stores web pages 50 (shown in FIG. 5) associated with one or more websites 48 in response to requests received by the user via the user computing device 22 to allow users to interact with the website and search and/or purchase products such as, for example, goods and/or services via the website. In one embodiment, the website hosting server 12 is configured to generate and display web pages 50 associated with the website in response to requests being received from consumers via corresponding web browsers that are displayed on the user computing devices 22. For example, in one embodiment, the website hosting server 12 may display a product search webpage 52 (shown in FIG. 5) in response to receiving a user request that allows a user to input a product search request including search criteria including one or more search terms. In one embodiment, the website hosting server 12 may allow customers to login and access corresponding customer accounts including account information such as, for example, previous purchase, pending orders, pending deliveries, and/or product preferences. For example, the website hosting server 12 may display a login page (not shown), receive a unique customer ID such as, for example, a username and/or password, and identify the customer account associated with the unique customer ID to enable the identified customer to access information and/or features associated with the corresponding customer account. In addition, the website hosting server 12 may transmit the product search request to the search engine server 14 and/or the product information server 16 for use in generating search data and/or product lists in response to the user's search request. The website hosting server 12 may also receive one or more product lists 54 (shown in FIG. 5) from the search engine server 14 and/or the product information server 16 that includes information associated with products that are selected based on the user's search criteria. The website hosting server 12 may also display a search results webpage 52 to display the product lists 54 to the user and to allow the user to select one or more of the displayed products for purchase.

In the illustrated embodiment, the search engine server 14 is configured to receive a product search request from the website hosting server 12 including one or more search terms, and generate search data including a plurality of product records as a function of the search terms. For example, in one embodiment, the search engine server 14 may initiate a search algorithm based on a Boolean model to search product records contained in the database 20 based search terms received from the user. The search engine server 14 may generate search data including product records 26 matching the search criteria, and generate a relevance score associated with each product record 26 included in the search data. In one embodiment, the relevance score may be determined based on statistical information, including, but not limited to the number of product records in the database, the frequency in which the search terms appear in the database, and the frequency in which the search term appears in the product record. The relevance of a returned search record may be determined based on the corresponding relevance score and the relevance scores of the other product records in the search data, wherein product records 26 having a higher relevance scores are more relevant to the search criteria. For example, in one embodiment, the product records may include a product description, item attribute, and/or item attribute values that include one or more terms associated with the corresponding product. The search engine server 14 may generate a relevance score associated with the product record as a function of the number of terms included in the product description that match the search terms included with product search request. In addition, the relevance score may be determined within a range between about 0.01 to 1.0, with a relevance score of 1.0 being indicative of the most relevant product record. Many variations to the above described method of determining a relevance score associated with a search request fall within the scope of the present invention.

In one embodiment, the search engine server 14 may also generate relevancy scores associated with the product record item attributes 36 and/or product categories based on the search data. The relevancy scores may be used to generate the ranked list 46 associated with item attributes 36 and/or product categories 32. In addition, the search engine server 14 may store each search request and/or search data in the database 20. The stored search request and/or search data may be used to generate the ranked list 46 as a function of previous product searches.

In the illustrated embodiment, the search engine server 14 generates the search data in response to the user's product search request and transmits the search data to the product information server 16 for use in generating product lists 54 being displayed to the user via one or more search results webpages 52. The product information server 16 is configured to receive the search data associated with the product search and generate the product list 54 in response to the product search request including retrieve and/or selecting product records 26 associated with the search data from the database 20. The selected product records 26 each include a corresponding product description 34 and a plurality of item attributes 36 having corresponding attribute values 38.

In the illustrated embodiment, the product information server 16 analyses the search data, selects a set 56 of item attributes 36, and generates a product summary snippet 58 (shown in FIG. 5) for each of the products 28 included in the search data as a function of the selected set of item attributes 36. The generated product summaries 58 include corresponding attribute values 38 associated with the selected set 56 of item attributes 36. In one embodiment, each product summary snippet 58 includes the same item attributes 36. In another embodiment, each product summary snippet 58 may include similar item attributes 36. In the illustrated embodiment, the product information server 16 generates the product list 54 including the search results for use in displaying the product list 54 on the search results webpage 52. The product list 54 includes product information 60 associated with the products 28 included in the search data. In the illustrated embodiment, the product information server 16 generates the product information 60 for each product 28 including the product description 34 included in the corresponding product record 26 and the corresponding product summary snippet 58. As shown in FIG. 5, in one embodiment, each product 28 is displayed on the search results webpage 52 including the corresponding product description 34 including the associated product image 40 and text 42, and the corresponding product summary snippet 58 including relevant information associated with the selected item attributes 36.

In one embodiment, the set 56 of item attributes 36 may include each of the item attributes 36 included in the product records 26. In another embodiment, the set 56 may include only a portion and/or subset of the plurality of item attributes 36, a predefined number of item attributes 36, and/or a number of item attributes 36 that are selected based on the search data and/or a corresponding customer account record. For example, in one embodiment, the search request may include one or more item attributes 36. The product information server 16 may select the set 56 to include item attributes 36 matching the search request. In addition, the search data may include a relevancy score associated with one or more of the item attributes 36. The product information server 16 may select the set 56 to include item attributes 36 having a predefined relevancy score.

The product information server 16 may also determine a product category 32 as a function of the product search request and select the item attributes 36 included in the set 56 of item attributes as a function of the product category. For example, in one embodiment, the product information server 16 may determine the product category 32 based on the search request and/or the search data, access the item attribute table 44 being stored in the database 20, and select the item attributes 36 to be included in the set 56 based on the item attributes 36 associated with the corresponding product category 32 in the item attribute table 44. The product information server 16 may also select a product category 32 based on the relevancy scores associated with each product category being include with the search data.

In one embodiment, the product information server 16 may also select item attributes 36 to be included in the set 56 based on the relative position of the item attributes 36 in the ranked list 46. For example, the product information server 16 may determine the item attributes 36 associated with a product category 32, determine a relative ranking of each of the associated item attributes 36 based on the ranked list 46, and select the item attributes 36 having higher relative rankings to be included in the set 56 of item attributes.

The product information server 16 may also determine an attribute ranking of the plurality of item attributes 36 included in the corresponding product records 26 and select the item attributes 36 to be included in the set 56 of item attributes as a function of the attribute ranking. In one embodiment, the product information server 16 may determine a relative position of a corresponding item attribute 36 within the attribute ranking as a function of a number of previous product search requests including the corresponding item attribute. For example, the product information server 16 may retrieve previous search requests and/or previous search data, determine a ranking of item attributes 36 as a function of the previous search requests and/or previous search data, and modify the ranked list 46 to adjust an item attribute ranking. In one embodiment, the product information server 16, may adjust the ranked list 46 based on a previous relevancy score of an item attribute 36. The product information server 16 may also modify the ranked list 46 as a function of a number of previous search requests.

For example, in one embodiment, the search results webpage 52 may be displayed with a plurality of search facets 62 that are accessible by the user to narrow and/or refine the product list 54 being displayed on the search results webpage 52. One or more of the search facets 62 may include item attributes 36 included in product records 26. For example, as shown in FIG. 5, in one embodiment, the search facets 62 may include, but are not limited to, product departments, price ranges, product categories, and/or any suitable search term that may be used to refine the displayed search results. Upon receiving a selection of a search facet 62 from a user via the webpage 52, the product information server 16 and/or the search engine server 14 may generate modified search data to include the product records associated with the selected search facet 62. In one embodiment, the product information server 16 may determine a popularity and/or relevant ranking of an item attribute 36 as a function of the number of times a corresponding facet 62 has been used by consumers to refine search requests.

In one embodiment, the product information server 16 may receive a unique customer ID associated with the corresponding user, and select the item attributes 36 included in the set 56 of item attributes 36 as a function of the unique customer ID. For example, the product information server 16 may identify the corresponding customer account including previous search requests, previous and/or pending orders, and/or product preferences, and select the item attributes 36 being displayed in the product summary snippets 58 based on the identified customer account. In addition, the product information server 16 may generate an attribute ranking as a function of previous search requests associated with the unique customer ID and select the item attributes 36 as a function of the attribute ranking.

In one embodiment, the product information server 16 may also associate a program search command with the item attributes 36 being displayed in the product summary snippets 58 to allow a user to access the search commands to generate additional search results as a function of the corresponding item attribute 36. For example, in one embodiment, a product summary 58 may be displayed with one or more hyperlinks associated with one or more attribute values being displayed in the product summary 58. The product information server 16 and/or search engine server 14 may generate and display a modified search result in response to the user and/or customer accessing the hyperlink. For example, the modified search result may include product records 26 having attribute values 38 matching the corresponding attribute value 38 associated with the accessed hyperlink and/or programmed search command. In one embodiment, the modified search result may including product records 26 included in the current product search result 54 and having attribute values 38 matching the corresponding attribute value. For example, the product information server 16 may display an initial product list 54 in response to a search request, allow a user to access a search command associated with an item attribute value 38, and generate and display a modified product list including product records 26 included in the initial product list 54 and having attribute values 38 matching the user requested attribute value. The product information server 16 may also modify the ranked list 46 as a function of the user requested attribute value 38 for use in generating and displaying product summaries 58.

Figure 2:
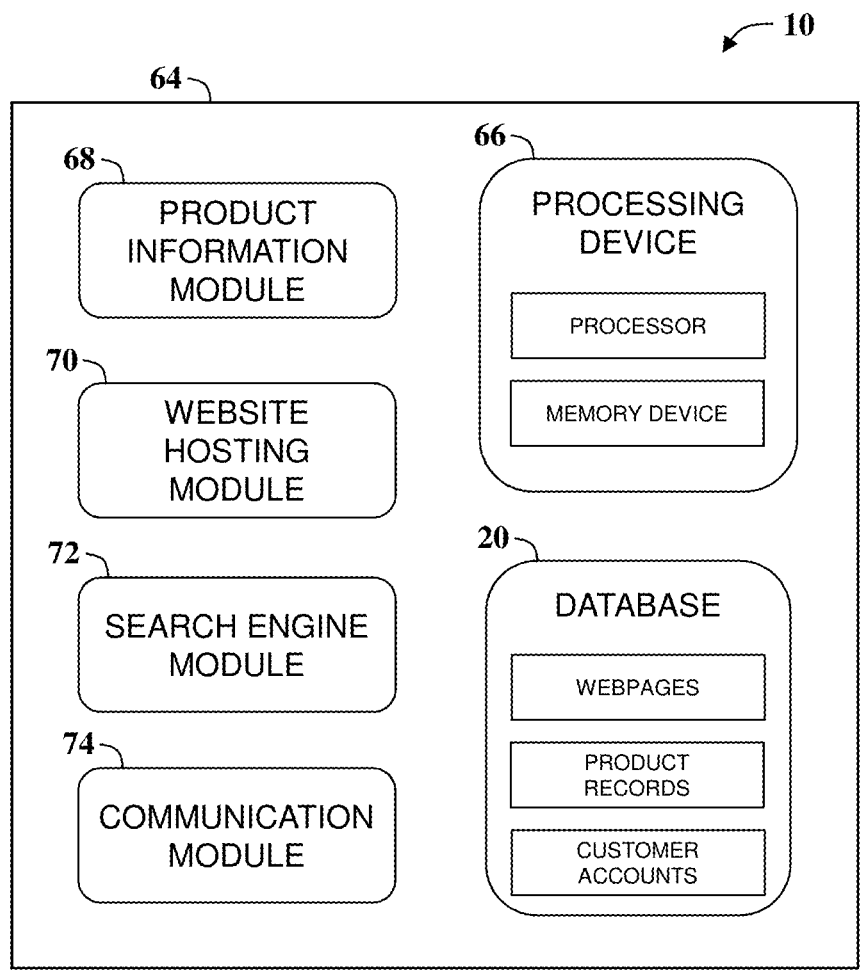
FIG. 2 is a schematic illustrating example components of a server, according to an embodiment of the present invention.

Referring to FIG. 2, in one embodiment, the system 10 may include a system server 64 that is configured to perform the functions of the website hosting server 12, the search engine server 14, the product information server 16, and the database server 18. In the illustrated embodiment, the system server 64 includes a processing device 66 and the database 20.

The processing device 66 executes various programs, and thereby controls components of the system server 64 according to user instructions received from the user computing device 22. The processing device 66 may include memory, e.g., read only memory (ROM) and random access memory (RAM), storing processor-executable instructions and one or more processors that execute the processor-executable instructions. In embodiments where the processing device 66 includes two or more processors, the processors can operate in a parallel or distributed manner. In an example, the processing device 66 may execute a product information module 68, a website hosting module 70, and a search engine module 72, and a communications module 74.

The processing device 66 may also include a memory device for storing programs and information in the database 20, and retrieving information from the database 20 that is used by the processor to perform various functions described herein. The memory device may include, but is not limited to, a hard disc drive, an optical disc drive, and/or a flash memory drive. Further, the memory device may be distributed and located at multiple locations.

The communications module 74 retrieves various data and information from the database 20 and sends information to the user computing device 22 via the communications network 24 to enable the user to access and interact with the system 10. In one embodiment, the communications module 74 displays various images on a graphical interface of the user computing device 22 preferably by using computer graphics and image data stored in the database 20 including, but not limited to, web pages, product records, sorted groups, product lists, and/or any suitable information and/or images that enable the system 10 to function as described herein.

The website hosting module 70 may be programmed to perform some or all of the functions of the website hosting server 12 including hosting various web pages associated with one or more websites that are stored in the database 20 and that are accessible to the user via the user computing device 22. The website hosting module 70 may be programmed to generate and display web pages associated with a website in response to requests being received from users via corresponding web browsers.

The search engine module 72 may be programmed to perform some or all of the functions of the search engine server 14 including generating and storing search data in response to the user's product search request. In addition, the search engine module 72 may also be programmed to generate a relevance score associated with each of the product records 26 included in the search data.

The product information module 68 may be programmed to perform some or all of the functions of the product information server 16 including selecting a set of item attributes and generating product summaries for each product being included in a search result as a function of the selected item attributes 36. The product information module 68 may also be programmed to generate and display a product list 54 including product information 60 that includes a corresponding product summary 58 and a corresponding product description 34 for each product 28 being displayed with a search result.

Figure 3:
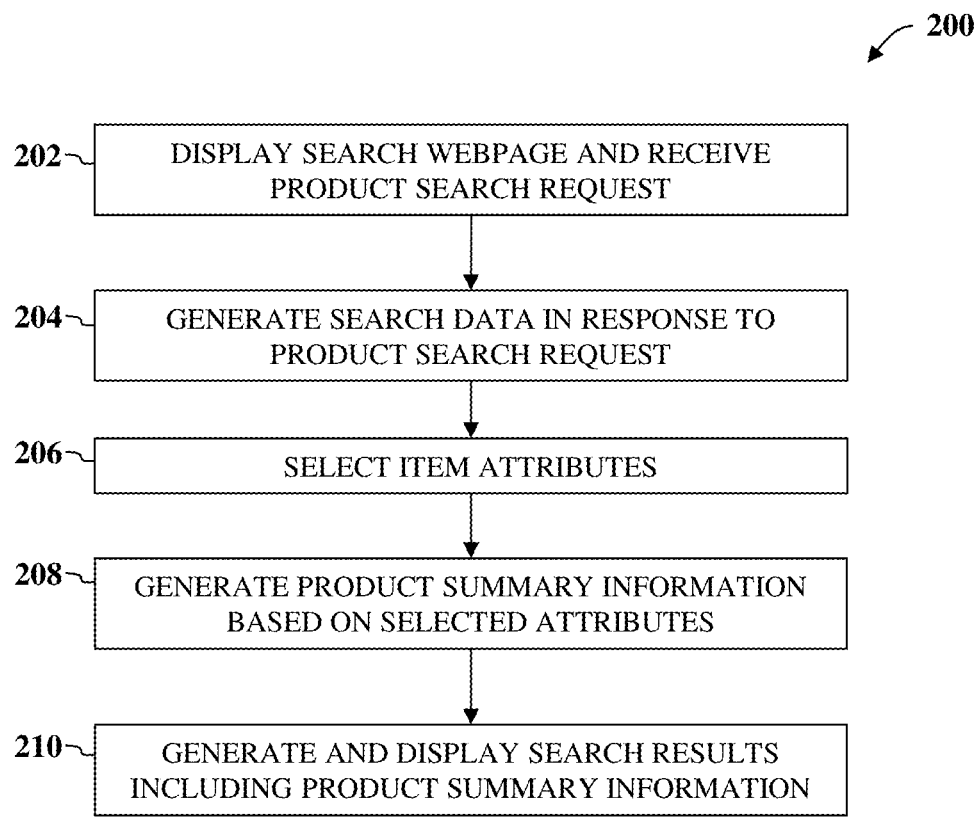
FIG. 3 is a flowchart of a method that may be used with the system shown in FIG. 1, according to an embodiment of the present invention.
Figure 4:
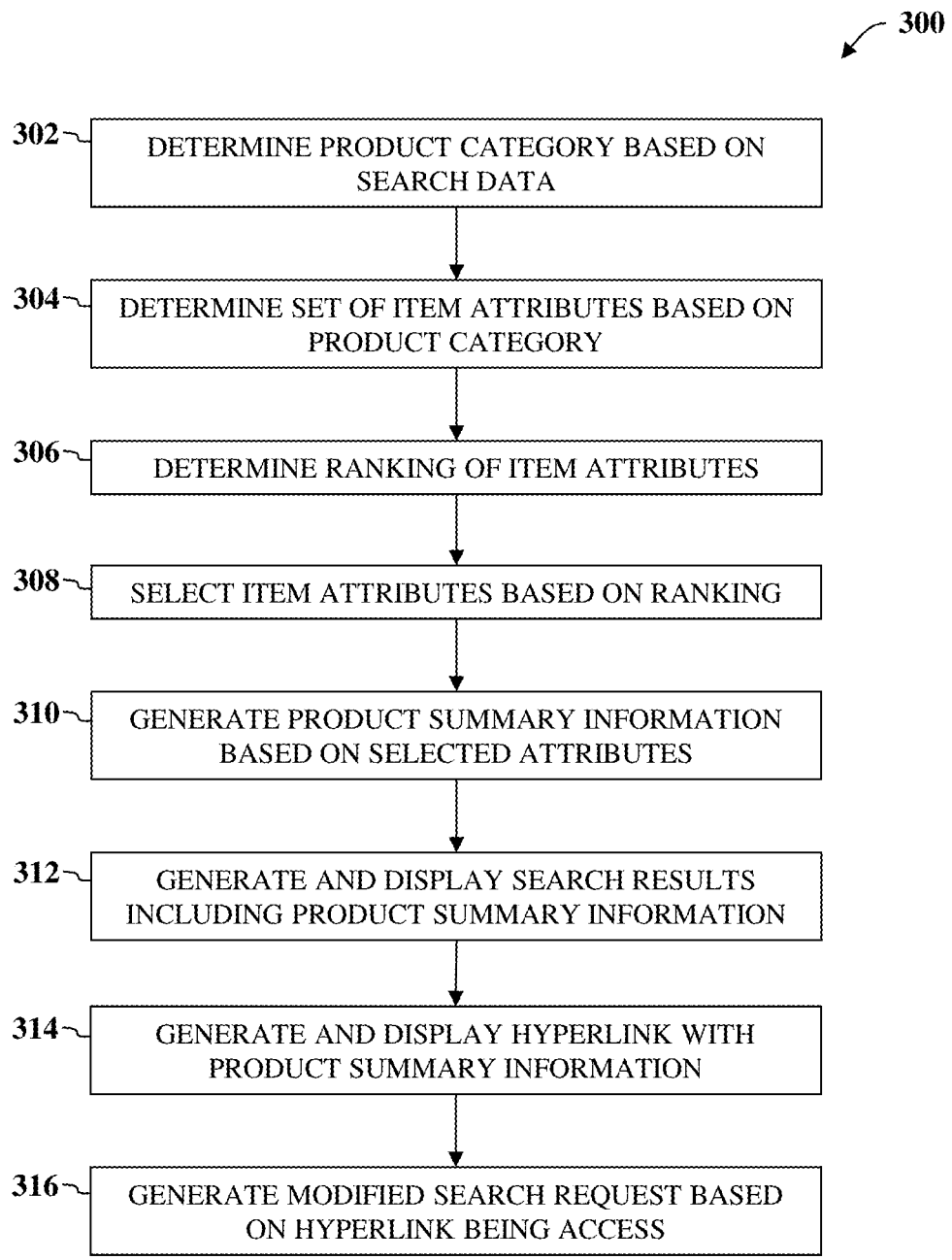
FIG. 4 is a flowchart of a method that may be used with the system shown in FIG. 1, according to an embodiment of the present invention.

FIGS. 3 and 4 are flowcharts of methods 200 and 300 that may be used with the system 10 for displaying product information on a website. The methods include a plurality of steps. Each method step may be performed independently of, or in combination with, other method steps. Portions of the methods may be performed by any one of, or any combination of, the components of the system 10. FIGS. 5-7 are exemplary graphical displays that may be displayed by the system 10.

In the illustrated embodiment, in method step 202, the website hosting server 12 receives a request from one or more user computing devices 22 to display one or more web pages 50 associated with a website hosted by the system 10, and retrieves and displays the requested web pages 50 on a corresponding user computing device 22. In one embodiment, the website may include an e-commerce website that enables a consumer to view and purchase and/or order various goods and services from one or more merchants via the website. In other embodiments, the website may be a search engine website, an informational website, a blog, a company website, a forum website, a file-sharing website, a social-networking website, and/or any suitable type of website that may be accessed by a user.

In the illustrated embodiment, the website hosting server 12 displays a search webpage 52 that allows users to enter search criteria associated with products that are available for purchase via the website 48. The website hosting server 12 generates a product search request as a function of the search criteria and transmits the search request to the search engine server 14 for use in generating search data in response to the user's search request.

In method step 204, the search engine server 14 generates search data including a plurality of product records 26 as a function of the search terms included in the received product search request. In one embodiment, the search engine server 14 may generate the search data including a listing of products based on the received search request and retrieves and/or selects product records 26 included in the database 20 matching the products included in the listing of products. In another embodiment, the search engine server 14 may generate the search data including product records 26 matching the search criteria, and generate a relevance score associated with each product record 26 included in the search data. The search engine server 14 also transmits the search data to the product information server 16 for use in generating a product list 54 for use in displaying the search results via a search webpage 52.

In method step 206, the product information server 16 selects a set 56 of item attributes 36 as a function of the search data. For example, in one embodiment, the product information server 16 may retrieve the product records 26 based on the search data, identify the item attributes 36 associated with the product records 26, and select a subset of the item attributes 36 based on a ranking that is determined based on criteria include in the search request. In addition, the selected set of item attributes may include a predefined number of item attributes 36.

In method step 208, the product information server 16 generates a product summary 58 for each of the products and/or product records 26 included in the search data as a function of the selected set of item attributes 36. For example, in one embodiment, the product information server 16 may generate each product summary 58 including the corresponding attribute values 38 associated with the selected set of item attributes 36.

In method step 210, the product information server 16 generates product information 60 for each of the products including the search data and displays a product search result including the product information 60 being displayed in a product list 54. The product information 60 associated with each product 28 includes the corresponding product summary 58 and a corresponding product description 34. For example, in one embodiment, for each product 28 being displayed, the product information server 16 retrieves the corresponding product image 40 and textual description 42 from the corresponding product records 26 and displays the product image 40, textual description 42, and the product summary snippet 58 with the corresponding product 28.

In one embodiment, the product information server 16 may be programmed to implement method 300. In method step 302, the product information server 16 determines a product category 32 as a function of the product search request. For example, the product information server 16 may receive relevancy scores associated with a plurality of product categories included in the search data and select a product category 32 based on the corresponding relevancy score. In another embodiment, the product information server 16 may access a corresponding customer account and select a product category 32 based on product preferences stored in the corresponding account.

In method step 304, the product information server 16 selects a set 56 of item attributes 36 as a function of the determined product category 32. For example, in one embodiment, the product information server 16 may access a item attribute table 44 that includes a list of item attributes 36 corresponding to a plurality of product categories 32 and select item attributes 36 being included in the set 56 based on the item attributes 36 corresponding to the selected product category 32.

In method step 306, the product information server 16 determines a ranking of item attributes 36 as a function of the search data and/or search request. For example, in one embodiment, the product information server 16 may generate a ranking of item attributes 36 based on the search data. The product information server 16 may also determine a position of a corresponding item attribute 36 within the attribute ranking as a function of a number of previous product search requests that have included the corresponding item attribute 36. In addition, the product information server 16 may generate an attribute ranking as a function of previous search requests associated with a unique customer identifier and select the item attributes 36 as a function of the attribute ranking.

In method step 308, the product information server 16 selects the item attributes 36 being included in the set 56 of item attributes 36 based on the ranking. In one embodiment, the product information server 16 may determine a ranking of item attributes 36 based on a ranked list 46 contained in the item attribute table 44.

In method step 310, the product information server 16 generates the product summary snippets 58 to include the selected item attributes 36 and the corresponding attribute values 38 included in the corresponding product records 26.

In method step 312, the product information server 16 generates and displays a product search result including product information 60 associated with each of the products 28 including the corresponding product summary 58 and a corresponding product description 34.

In method step 314, the product information server 16 generates and displays a hyperlink with one or more attribute values 38 being displayed in the product summary snippets 58. In one embodiment, the hyperlinks include program search commands that include the corresponding attribute value 38 to allow a user to further refine the search results based on the corresponding attribute value 38. In another embodiment, the hyperlink may include a program command that directs the website hosting server 12 to display a product webpage and/or information webpage (not shown) providing additional information associated with products having similar item attributes and/or attribute values.

In method step 316, the product information server 16 generates and displays a modified search result in response to the user accessing a corresponding hyperlink. For example, the modified search result may include product records having attribute values matching the corresponding attribute value. In addition, the modified search result may also include refined search results including product records included in the initial product search and having attribute values matching the corresponding attribute value.

In general, the system 10 is configured to generate and display product search results including automatically generating relevant product summary snippets using item attributes associated with the corresponding product. The attributes may describe product features such as, for example, product color, brand, and size in a more general case. Some of these attributes may also be category specific, e.g., computer items have attributes such as processor type and hard disk size. The structured product summary snippets present relevant product information in the form key-value pairs consisting of the most relevant item attributes. The system may also rank a set of attributes based on their popularity with respect to received search query. This results in a product summary snippet that is highly relevant to the search query. In addition, the system may generate product summary structured snippets that are user interactive and include hyperlinks that may initiate additional search features when accessed by the user. For example, by clicking on an attribute, e.g., color: blue, the system may can return all items having the attribute color: blue in the result set. The system may obtain the query-attribute popularity data from other user interactions such as, for example, facet clicks per query. For example, at least one advantage of displaying relevant product summary snippets is to help users compare the products in the search results instead of clicking to item descriptions. This reduces the user effort and time when they are using an ecommerce website and will thus lead to higher conversions. By providing product summary snippets that are relevant to the search query, the product summary snippets are significantly superior to conventional static text snippets.

By generating and displaying product summaries the system increases the likelihood of a consumer purchasing a product displayed in the list and increasing the overall revenue being generated by the website over known systems. In addition, by generating the product summaries for each product the system improves the speed and functionality of known computing systems by reducing the amount of product records being displayed in response to a user's search request, thus reducing the computing resources required to generate and display relevant search results.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. A system for generating a website for displaying product information to a customer, comprising:
 a database including an item attribute table and a plurality of product records associated with a plurality of products, each product record including a product description and a plurality of item attributes having corresponding attribute values, the item attribute table includes a plurality of product categories and a ranking of item attributes associated with each product category;
 a website hosting server configured to generate and display a product search website on a user computing device and receive, from a user via the user computing device, a product search request;
 a search engine server configured to receive the product search request from the website hosting server and generate search data including products associated with the product search request, and retrieve product records associated with the search data from the database and transmit the product records to the website hosting server; and
 a product information server configured to:
 receive the search data from the search engine server, determine a product category based on the product search request, and access the item attribute table and identify the item attributes associated with the product category;
 determine an attribute ranking of the identified item attributes and select a set of the identified item attributes based on the attribute ranking; and
 generate a product summary for each of the products included in the search data as a function of the selected set of identified item attributes and transmit each product summary to the website hosting server, each product summary including corresponding attribute values associated with the selected set of identified item attributes; and wherein the website hosting server is configured to generate and display a product search result webpage including product information associated with each of the products being included in the search data, the associated product information including the generated product summary and a corresponding product description.

2. A system in accordance with claim 1, the website hosting server is configured to:
 generate the product search result webpage to display the product summary including an image of the corresponding product and a product summary snippet displaying each attribute value associated with the selected set of item attributes.

3. A system in accordance with claim 2, the website hosting server is configured to:
 generate the product search result webpage to display a plurality of search facets, each search facet including an attribute value; and
 receive a user selection of a search facet via the product search result webpage and generate modified search data including product records having attribute values associated with the selected search facet.

4. A system in accordance with claim 3, the product information server is configured to determine a position of a corresponding item attribute within the attribute ranking as a function of a number of previous product search requests including the corresponding item attribute.

5. A system in accordance with claim 1, the product information server is configured to determine the attribute ranking as a function of the search request.

6. A system in accordance with claim 1, the product information server is configured to:
 receive a unique customer identifier; and
 select the item attributes being included in the set of item attributes as a function of the unique customer identifier.

7. A system in accordance with claim 6, the product information server is configured to generate an attribute ranking as a function of previous search requests associated with the unique customer identifier and select the item attributes as a function of the attribute ranking.

8. A system in accordance with claim 1, the website hosting server is configured to generate and display a hyperlink associated with an attribute value being displayed in the product summary.

9. A system in accordance with claim 8, the website hosting server is configured to generate and display a modified search result in response to the user accessing the hyperlink, the modified search result including product records having attribute values matching the corresponding attribute value.

10. A system in accordance with claim 9, the website hosting server is configured to generate the modified search result including product records included in the product search result and having attribute values matching the corresponding attribute value.

11. A method for operating a computer server system to display product information to customer via a website, including the steps of:
 a website hosting server generating and displaying a product search website on a user computing device and receiving a product search request from the customer via the user computing device;
 a search engine server generating search data in response to the product search request received from the customer, the search data including products associated with the product search request;

the search engine server retrieving product records associated with the search data from a database and transmitting the product records to the website hosting server, each product record being associated with a corresponding product and including a product description and a plurality of item attributes having corresponding attribute values;

a product information server determining a product category based on the product search request and accessing a an item attribute table from the database including a plurality of product categories and a ranking of item attributes associated with each product category;

the product information server identifying the item attributes associated with the product category, determining an attribute ranking of the identified item attributes, and selecting a set of the identified item attributes based on the attribute ranking;

the product information server generating a product summary for each of the products included in the search data as a function of the selected set of identified item attributes and transmit each product summary to the website hosting server, each product summary including corresponding attribute values associated with the selected set of identified item attributes; and the website hosting server generating and displaying a product search result webpage including product information associated with each of the products being included in the search data, the associated product information including the generated product summary and a corresponding product description.

12. A method in accordance with claim 11, including the steps of:
the website hosting server generating the product search result webpage to display the product summary including an image of the corresponding product and a product summary snippet displaying each attribute value associated with the selected set of item attributes.

13. A method in accordance with claim 11, including the steps of:
the website hosting server generating the product search result webpage to display a plurality of search facets, each search facet including an attribute value; and
the website hosting server receiving a user selection of a search facet via the product search result webpage and generate modified search data including product records having attribute values associated with the selected search facet.

14. A method in accordance with claim 13, including the step of the product information server determining a position of a corresponding item attribute within the attribute ranking as a function of a number of previous product search requests including the corresponding item attribute.

15. A method in accordance with claim 11, including the step of the product information server determining the attribute ranking as a function of the search request.

16. A method in accordance with claim 11, including the steps of:
the product information server receiving a unique customer identifier; and
the product information server selecting the item attributes being included in the set of item attributes as a function of the unique customer identifier.

17. A method in accordance with claim 16, including the step of the product information server generating an attribute ranking as a function of previous search requests associated with the unique customer identifier and select the item attributes as a function of the attribute ranking.

18. A method in accordance with claim 11, including the step of the website hosting server displaying the product summary including a hyperlink associated with an attribute value being displayed in the product summary.

19. A method in accordance with claim 18, including the step of the website hosting server generating and displaying a modified search result in response to the customer accessing the hyperlink, the modified search result including product records included in the product search result and having attribute values matching the corresponding attribute value.

20. One or more non-transitory computer-readable storage media, having computer-executable instructions embodied thereon, wherein when executed by at least one processor, the computer-executable instructions cause the at least one processor to function as:

a website hosting server configured to generate and display a product search website on a user computing device and receive a product search request from a customer via the user computing device;

a search engine server configured to:
generate search data in response to the product search request received from the customer, the search data including products associated with the product search request; and
retrieve product records associated with the search data from a database, each product record being associated with a corresponding product and including a product description and a plurality of item attributes having corresponding attribute values; and a product information server configured to:
determine a product category based on the product search request and access an item attribute table from the database including a plurality of product categories and a ranking of item attributes associated with each product category;
identify the item attributes associated with the product category, determine an attribute ranking of the identified item attributes, and select a set of the identified item attributes based on the attribute ranking; and
generate a product summary for each of the products included in the search data as a function of the selected set of identified item attributes and transmit each product summary to the website hosting server, each product summary including corresponding attribute values associated with the selected set of identified item attributes; and the website hosting server is configured to generate and display a product search result webpage including product information associated with each of the products being included in the search data, the associated product information including the generated product summary and a corresponding product description.

* * * * *